US011760168B2

(12) United States Patent
Van Wijk et al.

(10) Patent No.: US 11,760,168 B2
(45) Date of Patent: Sep. 19, 2023

(54) ANTI-LOCK TIRE SYSTEM

(71) Applicant: CARRIER CORPORATION, Palm Beach Gardens, FL (US)

(72) Inventors: Rudolf Johannes Van Wijk, Waddinxveen (NL); Peter van der Plas, Katwijk ZH (NL)

(73) Assignee: CARRIER CORPORATION, Palm Beach Gardens, FL (US)

(*) Notice: Subject to any disclaimer, the term of this patent is extended or adjusted under 35 U.S.C. 154(b) by 124 days.

(21) Appl. No.: 16/973,296

(22) PCT Filed: Sep. 27, 2019

(86) PCT No.: PCT/US2019/053447
§ 371 (c)(1),
(2) Date: Dec. 8, 2020

(87) PCT Pub. No.: WO2020/072301
PCT Pub. Date: Apr. 9, 2020

(65) Prior Publication Data
US 2021/0245579 A1 Aug. 12, 2021

Related U.S. Application Data

(60) Provisional application No. 62/740,646, filed on Oct. 3, 2018.

(51) Int. Cl.
*B60H 1/32* (2006.01)
*B60P 3/20* (2006.01)
(Continued)

(52) U.S. Cl.
CPC .............. *B60H 1/3232* (2013.01); *B60P 3/20* (2013.01); *B60L 1/20* (2013.01); *F25D 11/003* (2013.01); *H02J 7/1492* (2013.01)

(58) Field of Classification Search
CPC . B60H 1/3232; B60P 3/20; B60L 1/20; F25D 11/00; H02J 7/1492
See application file for complete search history.

(56) References Cited

U.S. PATENT DOCUMENTS 5,839,533 A 11/1998 Mikami et al.
5,895,100 A 4/1999 Ito et al.
(Continued)

FOREIGN PATENT DOCUMENTS

DE 10253707 A1 6/2003
KR 100634605 B1 4/2006
(Continued)

OTHER PUBLICATIONS

Aguilar et al. "Regenerative Intelligent Breaking Control for Electric Motorcycles" Energies, vol. 10, No. 10, Oct. 20, 2017 p. 1648.
(Continued)

*Primary Examiner* — Elizabeth J Martin
(74) *Attorney, Agent, or Firm* — CANTOR COLBURN LLP

(57) ABSTRACT

A transportation refrigeration system including: a transportation refrigeration unit; an energy storage device configured to provide electrical power to the transportation refrigeration unit; an electric generation device operably connected to at least one of a wheel and a wheel axle of the transport refrigeration system, the electric generation device being configured to generate electrical power from at least one of the wheel and the wheel axle to charge the energy storage device when the electric generation device is activated; a rotational velocity sensor configured to detect a rotational velocity of the electric generation device; and a power management module in electrical communication with the energy storage device, the electric generation device, and the rotational velocity sensor, wherein the power management module is configured to decrease a torque limit of the
(Continued)

electric generation device when the rotational velocity of the electric generation device decelerates greater than a selected deceleration.

20 Claims, 3 Drawing Sheets

(51) Int. Cl.
  *B60L 1/00* (2006.01)
  *F25D 11/00* (2006.01)
  *H02J 7/14* (2006.01)

(56) References Cited

U.S. PATENT DOCUMENTS

| | | | |
|---|---|---|---|
| 6,033,041 | A | 3/2000 | Koga et al. |
| 6,574,535 | B1 | 6/2003 | Morris et al. |
| 7,104,617 | B2 | 9/2006 | Brown |
| 7,201,095 | B2 | 4/2007 | Hughey |
| 8,215,436 | B2 | 7/2012 | Degrave et al. |
| 8,616,660 | B2 | 12/2013 | Kim |
| 8,744,659 | B2 | 6/2014 | Yamagata et al. |
| 8,776,928 | B2 | 7/2014 | Stover, Jr. et al. |
| 9,389,007 | B1 | 7/2016 | Mckay |
| 9,527,388 | B2 | 12/2016 | Saito et al. |
| 9,694,712 | B2 | 7/2017 | Healy |
| 9,834,084 | B2 | 12/2017 | Kim |
| 2008/0174174 | A1 | 7/2008 | Burns et al. |
| 2011/0251770 | A1 | 10/2011 | Minarcin et al. |
| 2016/0368384 | A1 * | 12/2016 | Johansson ............... B60L 3/102 |
| 2017/0036548 | A1 | 2/2017 | Kobayashi |
| 2018/0126862 | A1 | 5/2018 | Huh et al. |
| 2018/0244258 | A1 | 8/2018 | Mouri et al. |

FOREIGN PATENT DOCUMENTS

| | | | |
|---|---|---|---|
| WO | 2018134634 A1 | 7/2018 | |
| WO | WO-2018134634 A1 * | 7/2018 | ......... B60H 1/00428 |

OTHER PUBLICATIONS

Anonymous "Regenerative Braking Safety Issue Tesla Motors Club" https://teslamotorclub.com. Aug. 22, 2015 (pp. 1-17).

International Search Report and Written Opinion for International Application No. PCT/US2019/053447; International Filing Date Sep. 17, 2019; Report dated Feb. 26, 2020 (pp. 1-15).

Peterson, M. "Progressive Regenerative Braking using Real Time Speed Sensing", Roboteq Inc., Scottsdale, AZ, Retrieved Nov. 20, 2018 from http://www.eenewsautomotive.com/content/progressive-regenerative-braking-using-real-time-speed-sensing, 7 pages.

* cited by examiner

ANTI-LOCK TIRE SYSTEM

CROSS REFERENCE TO RELATED APPLICATIONS

This application is a US National Stage of International Application No. PCT/US2019/053447 filed Sep. 27, 2019, which claims the benefit of U.S. Provisional Application Ser. No. 62/740,646, filed on Oct. 3, 2018, which are incorporated herein by reference in their entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an AC synchronous generator that generates AC power. The generated AC power is used to power an electric motor for driving the refrigerant compressor of the transportation refrigeration unit and also powering electric AC fan motors for driving the condenser and evaporator motors and electric heaters associated with the evaporator. A more efficient method to power the electric motor is desired to reduce fuel usage.

BRIEF DESCRIPTION

According to one embodiment, a transport refrigeration system is provided. The transportation refrigeration system including: a transportation refrigeration unit; an energy storage device configured to provide electrical power to the transportation refrigeration unit; an electric generation device operably connected to at least one of a wheel of the transport refrigeration system and a wheel axle of the transport refrigeration system, the electric generation device being configured to generate electrical power from at least one of the wheel and the wheel axle to charge the energy storage device when the electric generation device is activated; a rotational velocity sensor configured to detect a rotational velocity of the electric generation device; and a power management module in electrical communication with the energy storage device, the electric generation device, and the rotational velocity sensor, wherein the power management module is configured to decrease a torque limit of the electric generation device when the rotational velocity of the electric generation device decelerates greater than a selected deceleration.

In addition to one or more of the features described above, or as an alternative, further embodiments of the transport refrigeration system may include that the torque limit is decreased for a selected period of time.

In addition to one or more of the features described above, or as an alternative, further embodiments of the transport refrigeration system may include that the torque limit is decreased until the rotational velocity increases to a selected rotational velocity.

In addition to one or more of the features described above, or as an alternative, further embodiments of the transport refrigeration system may include that the rotational velocity sensor is mechanically connected to the electric generation device.

In addition to one or more of the features described above, or as an alternative, further embodiments of the transport refrigeration system may include that the rotational velocity sensor is electrically connected to the electric generation device and configured to detect the rotational velocity of the electric generation device by measuring the electrical frequency output of the electric generation device.

In addition to one or more of the features described above, or as an alternative, further embodiments of the transport refrigeration system may include that the energy storage device includes a battery system.

In addition to one or more of the features described above, or as an alternative, further embodiments of the transport refrigeration system may include that the energy storage device is located outside of the transportation refrigeration unit.

In addition to one or more of the features described above, or as an alternative, further embodiments of the transport refrigeration system may include that the energy storage device is located within the transportation refrigeration unit.

According to another embodiment, a method of operating a transport refrigeration system including a vehicle integrally connected to a transport container is provided. The method including: powering a transportation refrigeration unit using an energy storage device, the transportation refrigeration unit being configured to provide conditioned air to refrigerated cargo space enclosed within the transport container; charging the energy storage device using an electric generation device operably connected to at least one of a wheel of the transport refrigeration system and a wheel axle of the transport refrigeration system, the electric generation device being configured to generate electrical power from at least one of the wheel and the wheel axle to charge the energy storage device when the electric generation device is activated; detecting a rotational velocity of the electric generation device using a rotational velocity sensor; and decreasing, using a power management module, a torque limit of the electric generation device when the rotational velocity of the electric generation device decelerates greater than a selected deceleration, the power management module being in electrical communication with the energy storage device, the electric generation device, and the rotational velocity sensor.

In addition to one or more of the features described above, or as an alternative, further embodiments of the transport refrigeration system may include that the torque limit is decreased for a selected period of time.

In addition to one or more of the features described above, or as an alternative, further embodiments of the transport refrigeration system may include: increasing the torque limit when the rotational velocity increases to a selected rotational velocity.

In addition to one or more of the features described above, or as an alternative, further embodiments of the transport refrigeration system may include that the rotational velocity sensor is mechanically connected to the electric generation device.

In addition to one or more of the features described above, or as an alternative, further embodiments of the transport refrigeration system may include that detecting a rotational velocity of the electric generation device using a rotational velocity sensor further includes: measuring, using the rotational velocity sensor, the electrical frequency output of the electric generation device to detect a rotational velocity of the electric generation device, the rotational velocity sensor being electrically connected to the electric generation device.

In addition to one or more of the features described above, or as an alternative, further embodiments of the transport refrigeration system may include that the energy storage device includes a battery system.

In addition to one or more of the features described above, or as an alternative, further embodiments of the transport refrigeration system may include that the energy storage device is located outside of the transportation refrigeration unit.

In addition to one or more of the features described above, or as an alternative, further embodiments of the transport refrigeration system may include that the energy storage device is located within the transportation refrigeration unit.

According to another embodiment, a computer program product tangibly embodied on a computer readable medium is provided. The computer program product including instructions that, when executed by a processor, cause the processor to perform operations including: powering a transportation refrigeration unit using an energy storage device, the transportation refrigeration unit being configured to provide conditioned air to refrigerated cargo space enclosed within the transport container; charging the energy storage device using an electric generation device operably connected to at least one of a wheel of the transport refrigeration system and a wheel axle of the transport refrigeration system, the electric generation device being configured to generate electrical power from at least one of the wheel and the wheel axle to charge the energy storage device when the electric generation device is activated; detecting a rotational velocity of the electric generation device using a rotational velocity sensor; and decreasing, using a power management module, a torque limit of the electric generation device when the rotational velocity of the electric generation device decelerates greater than a selected deceleration, the power management module being in electrical communication with the energy storage device, the electric generation device, and the rotational velocity sensor.

In addition to one or more of the features described above, or as an alternative, further embodiments of the transport refrigeration system may include that the operations further include: increasing the torque limit when the rotational velocity increases to a selected rotational velocity.

In addition to one or more of the features described above, or as an alternative, further embodiments of the transport refrigeration system may include that detecting a rotational velocity of the electric generation device using a rotational velocity sensor further includes: measuring, using the rotational velocity sensor, the electrical frequency output of the electric generation device to detect a rotational velocity of the electric generation device, the rotational velocity sensor being electrically connected to the electric generation device.

In addition to one or more of the features described above, or as an alternative, further embodiments of the transport refrigeration system may include that the torque limit is decreased for a selected period of time.

Technical effects of embodiments of the present disclosure include detecting wheel slippage utilizing a rotational velocity sensor operably connected to an electrical generator and determining a wheel slipping by detecting a spike in the deceleration of rotation velocity of the electrical generator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
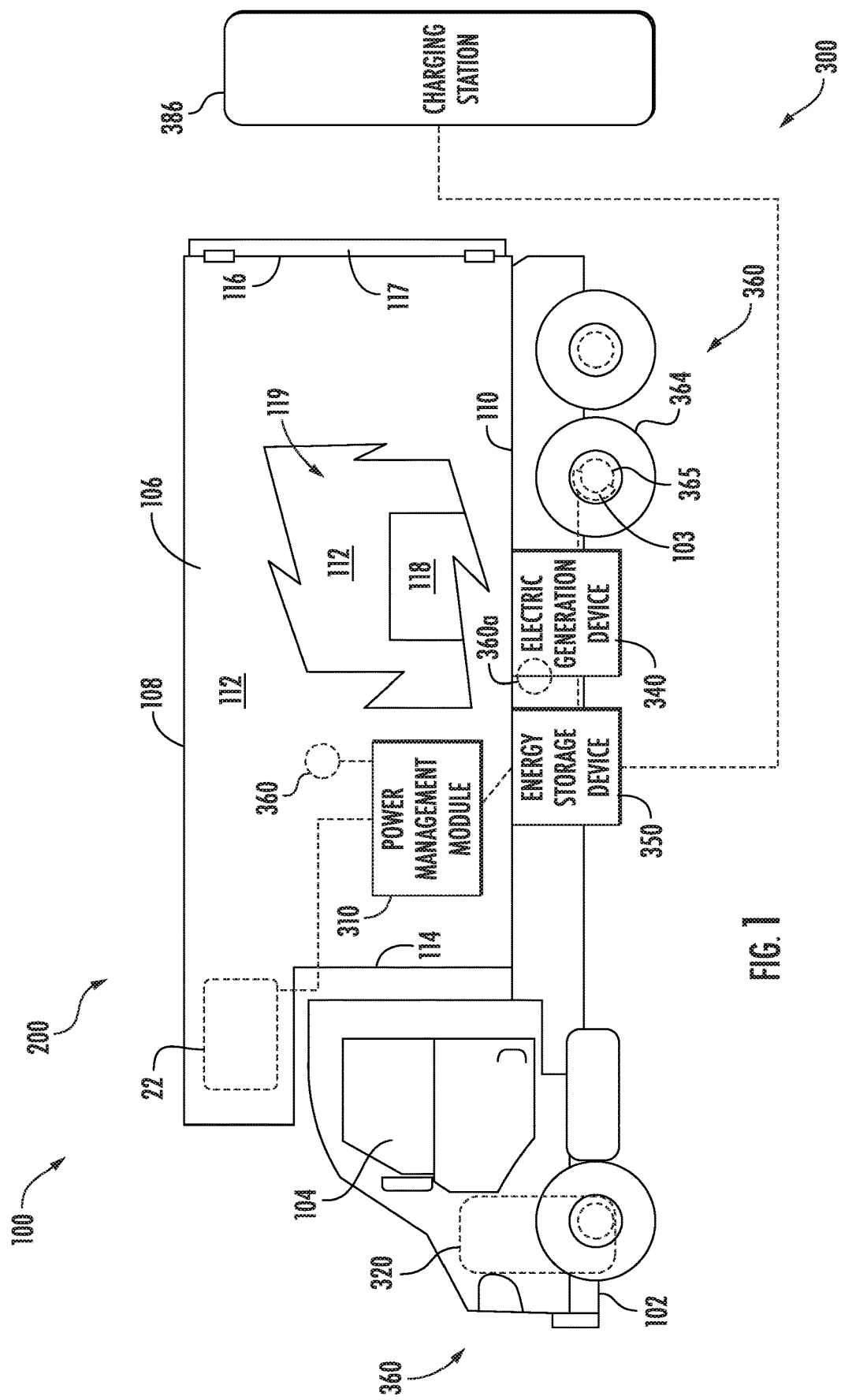
FIG. 1 is a schematic illustration of a transport refrigeration system, according to an embodiment of the present disclosure.
Figure 2:
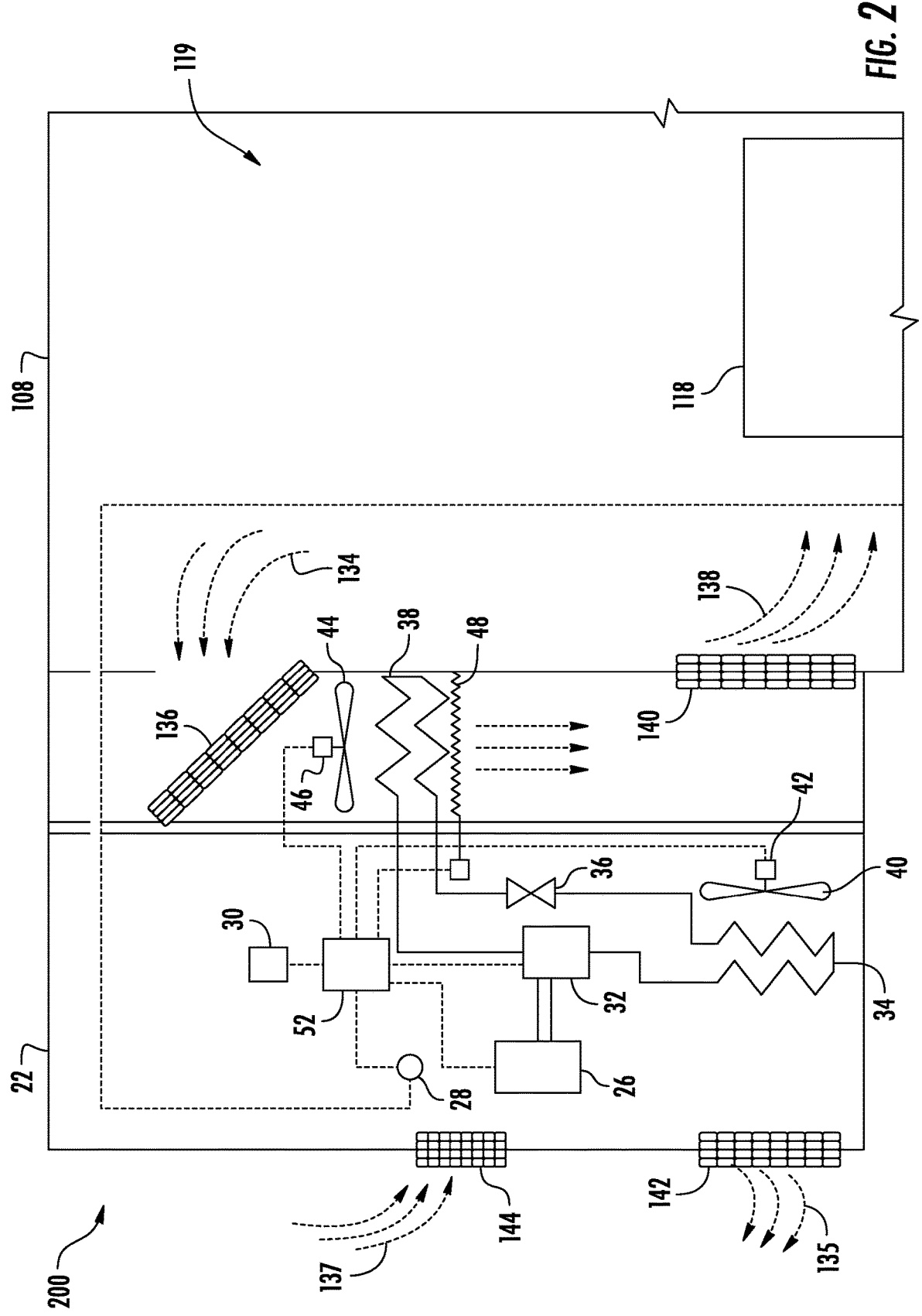
FIG. 2 is an enlarged schematic illustration of a transportation refrigeration unit of the transport refrigeration system of FIG. 1, according to an embodiment of the present disclosure.

Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 320 which acts as the drive system of the trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, a refrigerant compression device 32, an electric motor 26 for driving the refrigerant compression device 32, and a controller 30. The transportation refrigeration unit 22 is in operative association with the refrigerated cargo space 112 and is configured to provide conditioned air to the transport container 106. The transportation refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119, as known to one of ordinary skill in the art. In an embodiment, the transportation refrigeration unit 22 is capable of providing a desired temperature and humidity range.

The transportation refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transportation refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transportation refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transportation refrigeration unit 22 is operating in a subcritical refrigerant cycle or as a refrigerant gas cooler, such as if the transportation refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerate cargo space 119 of the transport container 106 by means of the transportation refrigeration unit 22. A return airflow 134 flows into the transportation refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transportation refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transportation refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transportation refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogeneously or heterogeneously. The memory may be a storage device such as, for example, a random access memory (RAM), read only memory (ROM), or other electronic, optical, magnetic or any other computer readable medium.

The transportation refrigeration unit 22 is powered by the energy storage device 350, which provides electrical power to the transportation refrigeration unit 22 and will be discussed further below. Examples of the energy storage device 350 may include a battery system (e.g., a battery or bank of batteries), fuel cells, flow battery, and others devices capable of storing and outputting electric energy that may be DC. The energy storage device 350 may include a battery system, which may employ multiple batteries organized into battery banks.

The battery 350 may be charged by a stationary charging station 386 such as, for example a wall 48V power outlet. The charging station 386 may provide single phase (e.g., level 2 charging capability) or three phase AC power to the energy storage device 350. It is understood that the charging station 386 may have any phase charging and embodiments disclosed herein are not limited to single phase or three phase AC power. In an embodiment, the single phase AC power may be a high voltage DC power, such as, for example, 500 VDC.

In one embodiment, the energy storage device 350 is located outside of the transportation refrigeration unit 22, as shown in FIG. 1. In another embodiment, the energy storage device 350 is located within the transportation refrigeration unit 22. The transportation refrigeration unit 22 has a plurality of electrical power demand loads on the energy storage device 350, including, but not limited to, the drive motor 42 for the fan 40 associated with the refrigerant heat rejection heat exchanger 34, and the drive motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, and DC to DC voltage converters, may be employed in connection with the energy storage device 150 as appropriate. In the depicted embodiment, the heater 48 also constitutes an electrical power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136. Additionally, the electric motor 26 being used to power the refrigerant compression device 32 also constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage from the energy storage device 350.

As described above the energy storage device 350 is used to electrical power the transportation refrigeration unit 22. The energy storage device 350 is integrated within an energy management system 300. The energy management system 300 comprises an electric generation device 340, the energy storage device 350 configured to provide electrical power to electric motor 26, the electric motor 26 configured to power the transportation refrigeration unit 22, a power management module 310, and an inertial sensor 360.

The electric generation device 340 is configured to harvest electrical power from kinetic energy of the trailer system 100. The electric generation device 340 can be at least one of an axle generator and a hub generator mounted configured to recover rotational energy when the transport refrigeration system 20 is in motion and convert that rotational energy to electrical energy, such as, for example, when the axle 365 of the trailer system 100 is rotating due to acceleration, cruising, or braking. The electric generation device 340 may be mounted on or operably connected to a wheel axle 365 of the trailer system 100 and the hub generator may be mounted on a wheel 364 of the trailer system 100. It is understood that the electric generation device 340 may be mounted on any wheel 364 or axle 365 of the trailer system 100 and the mounting location of the electric generation device 340 illustrated in FIG. 1 is one example of a mounting location.

The electric generation device 340 will then use the generated electrical power to charge the energy storage device 350. In an alternate embodiment, the electric generation device 340 may be operably connected to the wheel axle 365 or wheel 364 through at least one mechanical linkage, such as, for example a drive shaft, belt system, or gear system. The mechanical linkage configured to rotate the electric generation device 340 as the wheels 364 or wheel axle 365 rotates when the electric generation device 340 is activated. The electric generation device 340 may comprise a single on-board, engine driven AC generator configured to generate alternating current (AC) power including at least one AC voltage at one or more frequencies. In an embodiment, the electric generation device 340 may, for example, be a permanent magnet AC generator, asynchronous generator, or a synchronous AC generator. In another embodiment, the electric generation device 340 may comprise a single on-board, engine driven DC generator configured to generate direct current (DC) power at at least one voltage.

The inertial sensor 360 is configured to detect at least one of a deceleration of the vehicle 102 and a downward pitch of the vehicle 102 (e.g., indicating the vehicle 102 is moving downhill). The inertial sensor 360 may be a 5-axis sensor. The inertial sensor 360 may be configured to detect three linear accelerations and two rotational accelerations. The three linear acceleration may be along an X-axis, a Y-axis, and a Z-axis of a three-dimensional Cartesian coordinate system. The rotational accelerations may be around two of the three axis of the three-dimensional Cartesian coordinate system, such as, for example, the X-axis and the Z-axis. The inertial sensor 360 may accomplish this detection utilizing a plurality of connected sensors or a single sensor. In an embodiment, the inertial sensor 360 is a single sensor in electronic communication with the power management module 310. The power management module 310 is configured to activate the electric generation device 340 when the inertial sensor 360 detects at least one of the deceleration of the vehicle 102 and the downward pitch of the vehicle 102. The inertial sensor 360 may also include a GPS device in order to predict in advance at least one of the deceleration of the vehicle 102 and the downward pitch of the vehicle 102. The power management module 310 is in electrical communication with at least one of the energy storage device 350, the electric generation device 340, and the inertial sensor 360.

The power management module 310 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The inertial sensor 360 is configured to detect a deceleration of the vehicle 102. The inertial sensor 360 is in operative association with the vehicle 102 and may detect when a brake 103 of the vehicle 102 is being applied to slow the vehicle 102 and/or the vehicle 102 is decelerating without the brakes 103 being applied (i.e., driver lets foot off accelerator pedal). The inertial sensor 360 is in operative communication with the power management module 310 and the power management module 310 controls the operation of the inertial sensor 360. The power management module 310 is configured to activate the electric generation device 340 when the deceleration is greater than a selected deceleration, which may indicate that some propulsion motor 320 rotation is no longer needed to drive the vehicle 102 and it is a good time to bleed off some rotational energy of the wheels 364 or axle 365 of the trailer system 100 using the electric generation device 340. Bleeding off rotational energy of the wheels 364 or axle 365 when the vehicle 102 is decelerating helps reduce any performance impact to the ability of the propulsion motor 320 to power the vehicle 102.

The inertial pitch sensor 360 is also configured to detect a pitch angle of the vehicle 102. The power management module 310 is configured to activate the electric generation device 340 when the when the pitch angle is less than a selected pitch angle, which may indicate that some propulsion motor 320 rotation is no longer needed to drive the vehicle 102 and it is a good time to bleed off some rotational energy of the wheels 364 or axle 365 of the trailer system 100 using the electric generation device 340. For example, when the vehicle 102 is descending downhill with a negative pitch angle, gravity assists in driving the vehicle downhill and the full capacity of the e rotational energy of the wheels 364 and axle 365 may no longer be needed to drive the vehicle 102. Bleeding off rotational energy of the wheels 364 or axle 365 when the vehicle 102 is descending downhill helps reduce any performance impact to the ability of the propulsion motor 320 to power the vehicle 102.

The electric generation device 340 may also include a rotational velocity sensor 360a configured to measure the rotational velocity of the electric generation device 340 (e.g., rotations per minute (RPM)). The rotational velocity sensor 360a of the electric generation device is in operative communication with the power management module 310 and the power management module 310 may control the operation of the rotational velocity sensor 360a. The power management module 310 is configured to determine when the vehicle 102 is decelerating utilizing the inertial sensor 360 and/or the rotational velocity sensor 360a, which may indicate that some propulsion motor 320 rotation is no longer needed to drive the vehicle 102 (i.e., the vehicle is going downhill or decelerating) and it is a good time to bleed off some rotational energy of the wheels 364 or axle 365 of the trailer system 100 using the electric generation device 340. Bleeding off rotational energy of the wheels 364 or axle 365 when the vehicle 102 is decelerating or going downhill helps reduce any performance impact to the ability of the propulsion motor 320 to power the vehicle 102.

The power management module 310 may detect a state of charge of the energy storage device 350 and determine whether the energy storage device 350 may take additional charge (i.e., electrical power). For example, the power management module 310 may detect that the state of charge of the energy storage device 350 is less than a selected state of charge (e.g., 50% charged). If the power management module 310 detects that the state of charge of the energy storage device 350 is less than a selected state of charge then the power management module 310 may increase the torque limit of the electric generation device 340 for a selected period of time if the transport refrigeration system 200 is also detected to be decelerating and/or going downhill (i.e., free energy). The selected period of time may be short enough, such that the electric generation device 340 does not overheat. Advantageously, temporarily raising the torque limit of the electric generation device 340 for a selected period of time allows the electric generation device 340 to generate as much electric power as possibly when the energy is "free" and there is space in the energy storage device 350. As discussed above, energy may be considered "free" when the vehicle 102 is moving downhill or decelerating.

Additionally, the power management module 310 is configured to monitor the rotational velocity of the electric generation device 340 to detect wheel 364 slippage using the rotational velocity sensor 360a. In one embodiment, the rotational velocity sensor 360a may be a sensor mechanically connected to the electric generation device 340 to detect rotational velocity of the electric generation device 340. In another embodiment, the rotational velocity sensor 360a may be an electronic sensor electrically connected to the electric generation device 340 to detect rotational velocity of the electric generation device 340 by measuring the electrical frequency output of the electric generation device 340. In another embodiment, the rotational velocity sensor 360a may be an inverter connected to the electric generation device 340 to detect rotational velocity of the electric generation device 340 by measuring the electrical frequency output of the electric generation device 340. In yet another embodiment, the rotational velocity sensor 360a may be a wireless sensor capable of detecting rotational velocity of the electric generation device 340 wirelessly, such as, for example, RFID tracking, wireless capacitive sensor, wireless electromagnetic induction sensor, or any other wireless detection method known to one of skill in the art.

The power management module 310 is configured to detect and monitor the accelerations and decelerations of the electric generation device 340 in order to detect wheel 364 slippage. Sudden or rapid deceleration of the electric generation device 340 may indicate that the wheel 364 of the trailer system 100 has loss grip with the road surface below and the wheel 364 (e.g., tire) has started slipping. The power management module 310 is configured to decrease the torque limit of the electric generation device 340 when the rotational velocity of the electric generation device 340 decelerates greater than a selected deceleration. If the electric generation device 340 decelerates too fast, this may be indicative of wheel 364 slippage, thus the torque limit of the electric generation devices 340 may be temporarily lowered to help the wheel regain traction with the road until the wheel regains traction with the road surface. Decreasing the torque limit of the electric generation device 340 will cap the rotational velocity of the wheel 364, thus allowing the wheel 364 to slow and regain traction.

Figure 3:
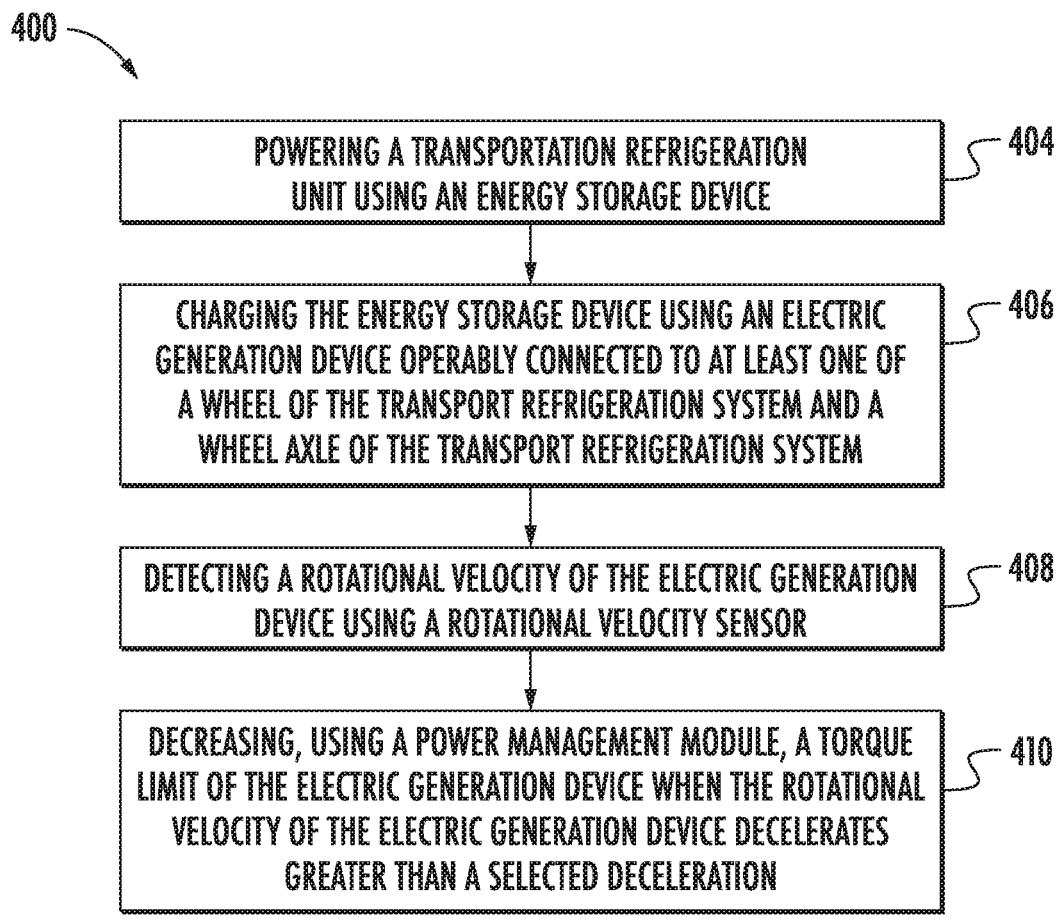
FIG. 3 is a flow process illustrating a method of operating the transport refrigeration system of FIGS. 1 and 2, according to an embodiment of the present disclosure.

Referring now to FIG. 3, with continued reference to FIGS. 1 and 2. FIG. 3 shows a flow process illustrating a method 400 of operating a transport refrigeration system 200 comprising a vehicle 102 integrally connected to a transport container 106, according to an embodiment of the present disclosure. At block 404, a transportation refrigeration unit 22 is powered using an energy storage device 350. As discussed above, the transportation refrigeration unit 22 is configured to provide conditioned air to refrigerated cargo space 112 enclosed within the transport container 106.

At block 406, the energy storage device 350 is charged using an electric generation device 340 operably connected to at least one of a wheel 364 of the transport refrigeration system 200 and a wheel axle 365 of the transport refrigeration system 200. The electric generation device 340 being configured to generate electrical power from at least one of a wheel 364 and a wheel axle 365 to charge the energy storage device 350 when the electric generation device 340 is activated. At block 408, an rotational velocity sensor 360a detects a rotational velocity of the electric generation device 340.

At block 410, a power management module 310 decreases a torque limit of the electric generation device 340 when the rotational velocity of the electric generation device 340 decelerates greater than a selected deceleration. In one embodiment, the torque limit is decreased for a selected period of time. In another embodiment, the torque limit is then increased when the rotational velocity increases to a selected rotational velocity, indicating that the wheel 364 has regained traction. When the rotational velocity of the electric generation device 340 is stable again and inside the working envelop, the power management module 310 will increase (slowly) the torque to a nominal value.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
   a transportation refrigeration unit;
   an energy storage device configured to provide electrical power to the transportation refrigeration unit;
   an electric generation device operably connected to at least one of a wheel of the transport refrigeration system and a wheel axle of the transport refrigeration system such that rotation of the at least one of the wheel and the wheel axle turns the electric generation device, the electric generation device being configured to generate electrical power from at least one of the wheel and the wheel axle to charge the energy storage device when the electric generation device is activated;
   a rotational velocity sensor configured to detect a rotational velocity of the electric generation device; and
   a power management module in electrical communication with the energy storage device, the electric generation device, and the rotational velocity sensor,
   wherein the power management module is configured to detect wheel slippage when the rotational velocity of the electric generation device decelerates greater than a selected deceleration;
   wherein the power management module is configured to decrease a torque limit of the electric generation device when the rotational velocity of the electric generation device decelerates greater than a selected deceleration.

2. The transport refrigeration system of claim 1, wherein the torque limit is decreased for a selected period of time.

3. The transport refrigeration system of claim 1, wherein the torque limit is decreased until the rotational velocity increases to a selected rotational velocity.

4. The transport refrigeration system of claim 1, wherein the rotational velocity sensor is mechanically connected to the electric generation device.

5. The transport refrigeration system of claim 1, wherein the rotational velocity sensor is electrically connected to the electric generation device and configured to detect the rotational velocity of the electric generation device by measuring the electrical frequency output of the electric generation device.

6. The transportation refrigeration system of claim 1, wherein the energy storage device includes a battery system.

7. The transportation refrigeration system of claim 1, wherein the energy storage device is located outside of the transportation refrigeration unit.

8. The transportation refrigeration system of claim 1, wherein the energy storage device is located within the transportation refrigeration unit.

9. A method of operating a transport refrigeration system comprising a vehicle integrally connected to a transport container, the method comprising:
    powering a transportation refrigeration unit using an energy storage device, the transportation refrigeration unit being configured to provide conditioned air to refrigerated cargo space enclosed within the transport container;
    charging the energy storage device using an electric generation device operably connected to at least one of a wheel of the transport refrigeration system and a wheel axle of the transport refrigeration system such that rotation of the at least one of the wheel and the wheel axle turns the electric generation device, the electric generation device being configured to generate electrical power from at least one of the wheel and the wheel axle to charge the energy storage device when the electric generation device is activated;
    detecting a rotational velocity of the electric generation device using a rotational velocity sensor;
    detecting wheel slippage when the rotational velocity of the electric generation device decelerates greater than a selected deceleration; and
    decreasing, using a power management module, a torque limit of the electric generation device when the rotational velocity of the electric generation device decelerates greater than a selected deceleration, the power management module being in electrical communication with the energy storage device, the electric generation device, and the rotational velocity sensor.

10. The method of claim 9, wherein the torque limit is decreased for a selected period of time.

11. The method of claim 9, further comprising:
    increasing the torque limit when the rotational velocity increases to a selected rotational velocity.

12. The method of claim 9, wherein the rotational velocity sensor is mechanically connected to the electric generation device.

13. The method of claim 9, wherein detecting a rotational velocity of the electric generation device using a rotational velocity sensor further comprises:
    measuring, using the rotational velocity sensor, the electrical frequency output of the electric generation device to detect a rotational velocity of the electric generation device, the rotational velocity sensor being electrically connected to the electric generation device.

14. The method of claim 9, wherein the energy storage device includes a battery system.

15. The method of claim 9, wherein the energy storage device is located outside of the transportation refrigeration unit.

16. The method of claim 9, wherein the energy storage device is located within the transportation refrigeration unit.

17. A computer program product tangibly embodied on a computer readable medium, the computer program product including instructions that, when executed by a processor, cause the processor to perform operations comprising:
    powering a transportation refrigeration unit using an energy storage device, the transportation refrigeration unit being configured to provide conditioned air to refrigerated cargo space enclosed within the transport container;
    charging the energy storage device using an electric generation device operably connected to at least one of a wheel of the transport refrigeration system and a wheel axle of the transport refrigeration system such that rotation of the at least one of the wheel and the wheel axle turns the electric generation device, the electric generation device being configured to generate electrical power from at least one of the wheel and the wheel axle to charge the energy storage device when the electric generation device is activated;
    detecting a rotational velocity of the electric generation device using a rotational velocity sensor;
    detecting wheel slippage when the rotational velocity of the electric generation device decelerates greater than a selected deceleration; and
    decreasing, using a power management module, a torque limit of the electric generation device when the rotational velocity of the electric generation device decelerates greater than a selected deceleration, the power management module being in electrical communication with the energy storage device, the electric generation device, and the rotational velocity sensor.

18. The computer program product of claim 17, wherein the operations further comprise:
    increasing the torque limit when the rotational velocity increases to a selected rotational velocity.

19. The computer program product of claim 17, wherein detecting a rotational velocity of the electric generation device using a rotational velocity sensor further comprises:
    measuring, using the rotational velocity sensor, the electrical frequency output of the electric generation device to detect a rotational velocity of the electric generation device, the rotational velocity sensor being electrically connected to the electric generation device.

20. The computer program product of claim 17, wherein the torque limit is decreased for a selected period of time.

* * * * *